US008496172B2

(12) United States Patent
Tatai et al.

(10) Patent No.: US 8,496,172 B2

(45) Date of Patent: Jul. 30, 2013

(54) SHEET SWITCH, SENSING MECHANISM, AND CARD READER

(75) Inventors: Toshio Tatai, Nagano (JP); Kazunori Takahashi, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 212 days.

(21) Appl. No.: 13/123,957

(22) PCT Filed: Oct. 20, 2009

(86) PCT No.: PCT/JP2009/005479

§ 371 (c)(1), (2), (4) Date: May 6, 2011

(87) PCT Pub. No.: WO2010/047087

PCT Pub. Date: Apr. 29, 2010

(65) Prior Publication Data

US 2011/0204146 A1 Aug. 25, 2011

(30) Foreign Application Priority Data

Oct. 24, 2008 (JP) ................................ 2008-273904

(51) Int. Cl.
*G06K 7/00* (2006.01)

(52) U.S. Cl.
USPC .......................................... 235/439; 235/487

(58) Field of Classification Search
USPC ................. 200/5 A, 83 B, 86 R, 159 B, 160, 200/302.1, 302.2, 308, 310, 314, 317, 329, 200/340; 235/375, 487, 439
See application file for complete search history.

(56) References Cited

U.S. PATENT DOCUMENTS 4,771,139 A * 9/1988 DeSmet ....................... 200/5 A

FOREIGN PATENT DOCUMENTS

| | | |
|---|---|---|
| JP | 2002-170455 | 6/2002 |
| JP | 2005-078864 | 3/2005 |
| JP | 2005-183171 | 7/2005 |
| JP | 2006-180244 | 7/2006 |
| JP | 2007-018887 | 1/2007 |

* cited by examiner

*Primary Examiner* — Karl D Frech
(74) *Attorney, Agent, or Firm* — Frommer Lawrence & Haug LLP

(57) ABSTRACT

Provided is a sheet switch suitable as a sensing mechanism to sense the removal of a subordinate device from a host device. Specifically, the sheet switch is provided with a contact electrode formed in a dome shape with a conductive metal, a counter electrode disposed facing the contact electrode, and a metal sheet made of metal that is disposed on the opposite side of the counter electrode from the side facing the contact electrode with insulating members interposed therebetween. The sheet switch becomes conductive when the contact electrode and the counter electrode touch.

9 Claims, 7 Drawing Sheets

SHEET SWITCH, SENSING MECHANISM, AND CARD READER

The present application claims priority from PCT Patent Application No. PCT/JP2009/005479 filed on Oct. 20, 2009, which claims priority from Japanese Patent Application Nos. JP 2008-273904 filed on Oct. 24, 2008 the disclosures of which is incorporated herein by reference in its entirety.

BACKGROUND OF THE INVENTION

1. Field of the Invention

The present invention relates to a sheet switch, a sensing mechanism having the sheet switch, and a card reader having the sensing mechanism.

2. Description of Related Art

Card readers which reproduce the data written on cards such as magnetic cards, IC cards, or the like or record data thereon are installed as subordinate devices in host devices, for example, ATM and the like. Popular card readers of this type include IC card readers which are constructed to prevent IC cards from various frauds (tampering activities) committed in an attempt to reproduce the data stored in the card for counterfeiting (i.e. See JP 2006-180244A).

In the IC card reader as described in JP 2006-180244A, when the IC card reader is removed from the host device and its secure board is physically attacked, the attack is sensed by the tamper-switch, and the key data in the secured board is deleted automatically.

In recent years, in order to prevent tampering, the PCI-PED or PCI-UPT standard based card readers have been demand by the market. In order to satisfy the PCI-PED or PCI-UPT standards, there is a clause requiring sensing of the removal of card readers from host devices.

However, conventionally, a sheet switch is known as a thin light weight switch used for operating parts of electric devices (i.e. See JP 2007-018887A). The sheet switch described in JP 2007-018887A comprises a resin surface sheet on which a contact electrode is mounted and a resin counter sheet on which a counter electrode facing the contact electrode is mounted.

SUMMARY OF THE INVENTION

As described above, in order to satisfy the PCT-PED or PCTI-UPT standards, the removal of the card reader from the host device must be sensed. And in order to enhance the security performance of the card reader, it is preferable that the removal of the card reader from the host device be sensed, even if a card reader is lifted only slightly from a host device.

In order to overcome the problem, the present inventors tried to apply the above-mentioned sheet switch to the sensing mechanism to detect the removal of the card reader from the host device. Specifically, the sheet switch was positioned in such a way that a card reader is fixed on the host device in the state in which the contact electrode the counter electrode are in contact with each other, and the contact electrode and the counter electrode separate when the card reader is removed from the host device.

Nevertheless, through the investigation by the inventors, it became clear that, under certain conditions, the conventional sheet switch used as is could not detect the removal of the card reader from the host device appropriately. Specifically, through the investigation by the inventors, it became clear that, particularly under high temperatures, due to creep deformation of the surface sheet or counter sheet, the contact electrode and the counter electrode stay in contact and do not separate when the card reader is removed from the host device.

For this reason, the object of the present invention is to provide a sheet switch which is suitable for the sensing mechanism for sensing the removal of the subordinate device from the host device. Moreover, the object of the present invention is to provide a card reader which comprises a sensing mechanism having the switch, and the sensing mechanism.

In order to overcome the problem, the sheet switch of the present invention is characterized in that it comprises a contact electrode formed in a dome shape with a conductive metal; a counter electrode disposed facing the contact electrode; and a metal sheet made of metal that is disposed on the opposite side of the counter electrode from the side facing the contact electrode with insulating members interposed therebetween wherein the contact electrode and the counter electrode come into contact with each other to become conductive.

In the sheet switch of the present invention, the contact electrode is formed in a dome shape with a conductive metal. In other words, the contact electrode is not mounted on a resin sheet. Therefore, creep deformation does not occur on the resin sheet on which the contact electrode is mounted. Moreover, since the contact electrode is formed with metal, the problem of creep deformation does not occur easily, even under high-temperature conditions.

Moreover, in the sheet switch of the present invention, a metal sheet is disposed on the opposite side of the counter electrode from the side facing the contact electrode with insulating members interposed therebetween. For this reason, even if the counter electrode is mounted (or formed) on a resin sheet, the sheet does not deform easily, and the pressure, generated by the contact between the contact electrode and the counter electrode, tends not to be concentrated on one part of this sheet. Therefore, creep deformation occurs with difficulty on the sheet on which the counter electrode is mounted.

As described above, in the present invention, the creep phenomenon generated on the counter electrode side can be prevented, and, at the same time, the creep phenomenon generated on the contact electrode side can be suppressed. Accordingly, with the sheet switch of the present invention for the sensing mechanism to detect the removal of the subordinate device from the host device, the contact electrode and the counter electrode can be prevented from generating the problem of coming into contact with each other and not separating. In other words, the sheet switch of the present invention is suitable for the sensing mechanism which senses the removal of the subordinate device from the host device.

In the present invention, It is preferable that the sheet switch be provided with an insulating surface sheet to cover the surface of the contact electrode and that the surface sheet be in contact with the contact electrode without being bonded thereto. In this case, for instance, the sheet switch comprises a cover sheet to cover the surface of the conductive pattern connected to the counter electrode, and a spacer interposed between the surface sheet and the cover sheet with an arrangement hole on which the contact electrode is mounted, wherein the surface sheet is bonded to the spacer.

With this configuration, the contact electrode is unlikely to be affected by the effects of creep deformation of the surface sheet, even if the surface sheet for protecting the contact electrode undergoes creep deformation. Accordingly, the contact electrode and the counter electrode can be prevented from generating the problem of coming into contact with each other and not separating without fail.

In the present invention, it is preferable that the contact electrode be formed with a metallic material comprising a spring member. With this configuration, by removing the pressing force against the contact electrode, the elastic recovery force of the contact electrode can separate the contact electrode from the counter electrode reliably.

In the present invention, it is preferable that the contact electrode and the metal sheet be formed from a stainless steel. With this configuration, the contact electrode tends not to undergo creep deformation. Moreover, since the stainless steel plate has a relatively large Young's modulus, with this configuration, permanent deformation occurs with difficulty on the metal sheet, even if the pressure is applied to the metal sheet when the contact electrode and the counter electrode are in contact with each other. Therefore, for example, even if the counter electrode is mounted on a resin sheet, the pressure generated by the contact between the contact electrode and the counter electrode can be spread over the resin sheet easily.

The sheet switch of the present invention can be used for the sensing mechanism equipped with a shock-absorbing member which is in contact with a metal sheet. In this sensing mechanism, the creep phenomenon generated on the contact electrode side can be prevented, and, at the same time, the creep phenomenon generated on the counter electrode side can be suppressed. Therefore, by using this sensing mechanism to sense the removal of the subordinate device from the host device, the contact electrode and the counter electrode can be prevented from generating the problem of coming into contact with each other and not separating.

Moreover, since this sensing mechanism is equipped with a shock-absorbing member which comes into contact with the metal sheet, even if the sheet switch is positioned in such a way that, for example, it protrudes outward from the mounting surface of the subordinate device, the sheet switch can be prevented from damages. For this reason, the sheet switch can be provided in the condition in which it protrudes outwards from the mounting surface of the subordinate device. Therefore, even if the contact sections of the host device vary in size, the contact sections can touch the sheet switch reliably, and enable the contact between the contact section and the sheet switch.

In the present invention, it is preferable that the sensing mechanism be equipped with a holding member to hold a shock-absorbing member and that the holding member be provided with a recessed arrangement section on which shock-absorbing member is mounted. With this configuration, the shock-absorbing member can be aligned easily, and the sensing mechanism can be assembled easily In the present invention, it is preferable that the shock-absorbing member be equipped with a contact pressure receiving section, which is disposed at the position corresponding the contact point between the contact electrode and the counter electrode, and a notch section so that the entire perimeter of the outside circumference surface of the shock-absorbing member does not touch the wall surface of the recessed arrangement section. With this configuration, the stress applied to the contact pressure receiving section can be released by deforming the shock-absorbing member while the contact electrode and the counter electrode are in contact. Accordingly, the sheet on which the counter electrode is mounted is less subjected to excess stress; creep deformation of the sheet on which the counter electrode is mounted is easily prevented.

In the present invention, it is preferable that the shock-absorbing member be provided with a cross-shaped section formed substantially in a cross-shape around the contact receiving [sic, contact pressure-receiving] section, and that at least one end of the cross-shaped section be able to come into contact with the wall surface of the recessed arrangement section. With this configuration, the stress applied to the contact pressure-receiving section can be released, and the shock-absorbing members can be aligned easily.

In the sensing mechanism of the present invention, for example, in the state in which the subordinate device is attached to the host device, the contact electrode and the counter electrode come into contact with each other, and when the subordinate device is removed from the host device, the contact electrode and the counter electrode separate. This sensing mechanism can be used for the card reader which is attached to the host device in the state in which the contact electrode and the counter electrode are in contact with each other. Since this card reader can prevent the contact electrode and the counter electrode from generating the problem of coming into contact with each other and not separating, the removal of the card reader from the host device can be sensed reliably.

As described above, by using the sheet switch of the present invention for a sensing mechanism which senses the removal of the subordinate device from the host device, the contact electrode and the counter electrode can be prevented from generating the problem of coming into contact with each other and not separating. Moreover, by the use of the sensing mechanism of the present invention for sensing the removal of the subordinate device from the host device, the contact electrode and the counter electrode can be prevented from generating the problem of coming into contact with each other and not separating. Furthermore, because the card reader of the present invention can prevent the contact electrode and the counter electrode from generating the problem of coming into contact with each other and not separating, the removal of the card reader from the host device can be sensed reliably.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
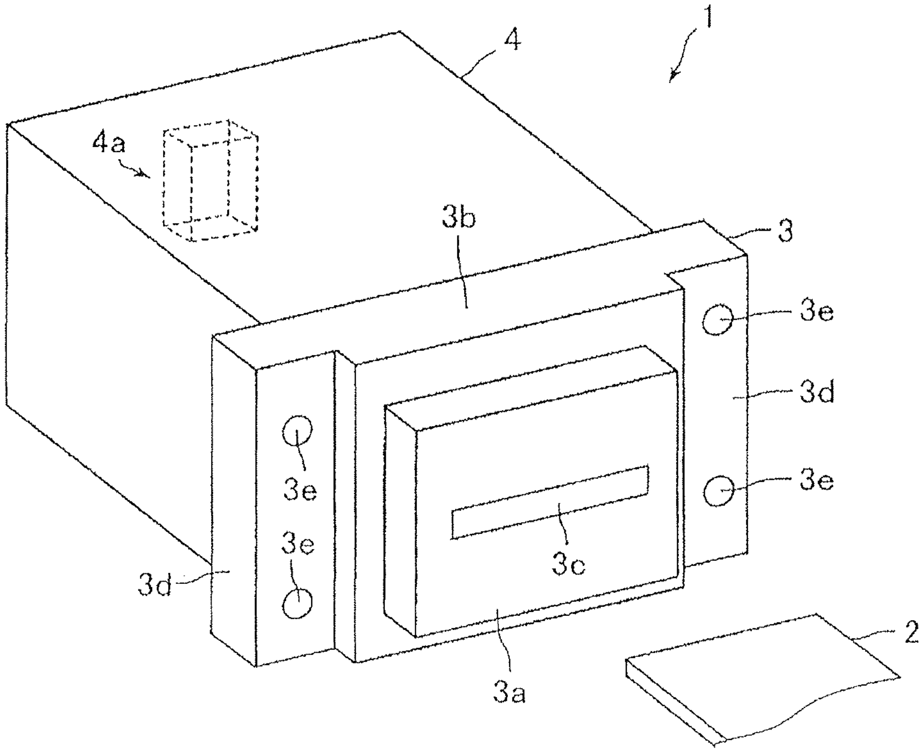
FIG. 1 is a perspective view of the card reader of the embodiment of the present invention.
Figure 2:
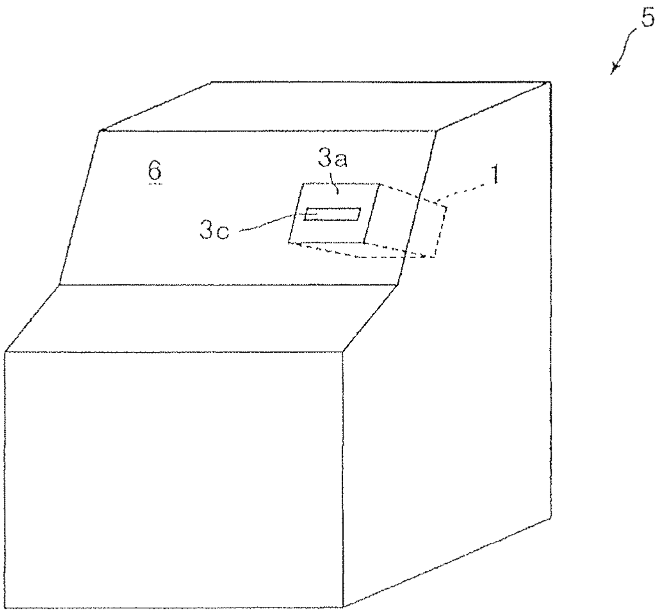
FIG. 2 is a schematic perspective view of the host device mounted on the card reader as illustrated in FIG. 1.
Figure 3:
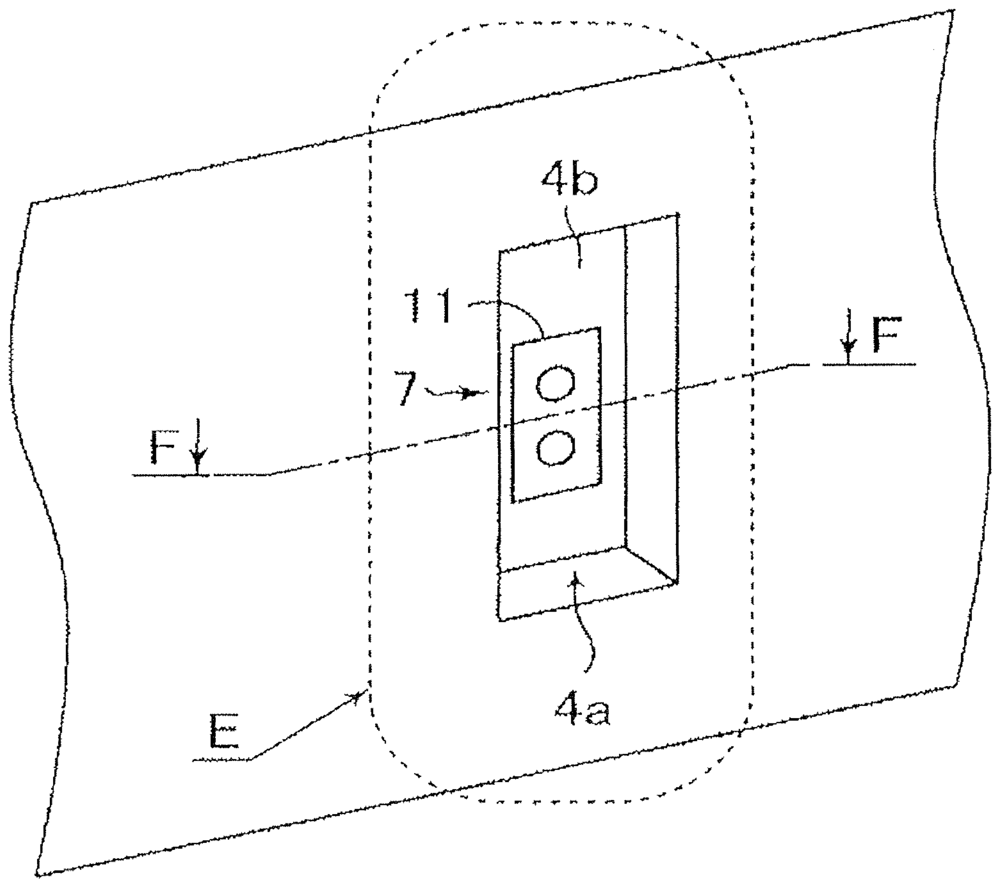
FIG. 3 is a perspective view of a part of the back face of the card reader as illustrated in FIG. 1.

Schematic Configuration of the Card Reader:

FIG. 1 is a perspective view of card reader 1 of the embodiment of the present invention. FIG. 2 is a perspective view showing the schematic configuration of host device 5 to which card reader 1 is attached. FIG. 3 is a perspective view showing a part of the back face of card reader 1 in FIG. 1.

Card reader 1 of this embodiment comprises, as illustrated in FIG. 1, card insert-eject port 3 through which card 2 is inserted and ejected; and card processing section 4 which reproduces the data recorded on card 2 and/or record data on card 2. As illustrated in FIG. 2, this card reader 1 is attached to host device 5 such as ATM, KIOSK terminals, and the like.

Card 2 is, for example, a vinyl chloride card formed in a rectangular shape having a thickness of 0.7~0.8 mm. The surface of this card 2 is provided with, for example, a magnetic stripe to record magnetic data. Moreover, for example, the surface of card 2 is provided with an IC chip fixed thereto. Further, card 2 may have a built-in communication antenna. Additionally, a printing section to undergo thermal printing may also be provided on the surface of card 2. Furthermore, card 2 may be a polyethyleneterefuthalate (PET) card having a thickness of about 0.18~0.36 mm, or a paper card and the like having a given thickness.

Card insert-eject port 3 comprises exposed section 3*a* provided through the opening formed on front panel 6 of host device 5. Exposed section 3*a* is provided so that it protrudes from main body section 3*b* of card insert-eject section 3 pointing toward the front side of the sheet in FIG. 1. Moreover, exposed section 3*a* is provided with card insert-eject port 3*c* through which card 2 is inserted and ejected.

Both the right and left sides of exposed section 3*a* in FIG. 1 are provided with mounting sections 3*d* to attach card reader 1 to host device 5. Mounting sections 3*d* are provided with insertion holes 3*e* in which screws (not illustrated) are inserted to fix card reader 1 on host device 5.

Card processing section 4 is equipped with a recording-reproducing means such as magnetic head, IC contact and/or communication antenna and the like, for recording or reproducing the data. Back of the body frame of card processing section 4 (the rear end of the sheet in FIG. 1), as illustrated in FIG. 3, is provided with recessed mounting section 4*a* which is recessed from the back face of the body frame. The bottom face of this recessed mounting section 4*a* provides mounting surface 4*b* (mounting reference plane) to mount card reader 1 on host device 5. Moreover, to recessed mounting section 4*a*, sensing mechanism 7 is provided to sense the removal of card reader 1 from host device 5. The detailed configuration of sensing mechanism 7 and its peripheral components are described later.

Further, card processing section 4 may or may not comprise a card transfer mechanism to transfer card 2 in card processing section 4. In other words, card reader 1 may be a self-propelled or it may be a manual card reader.

Figure 4:
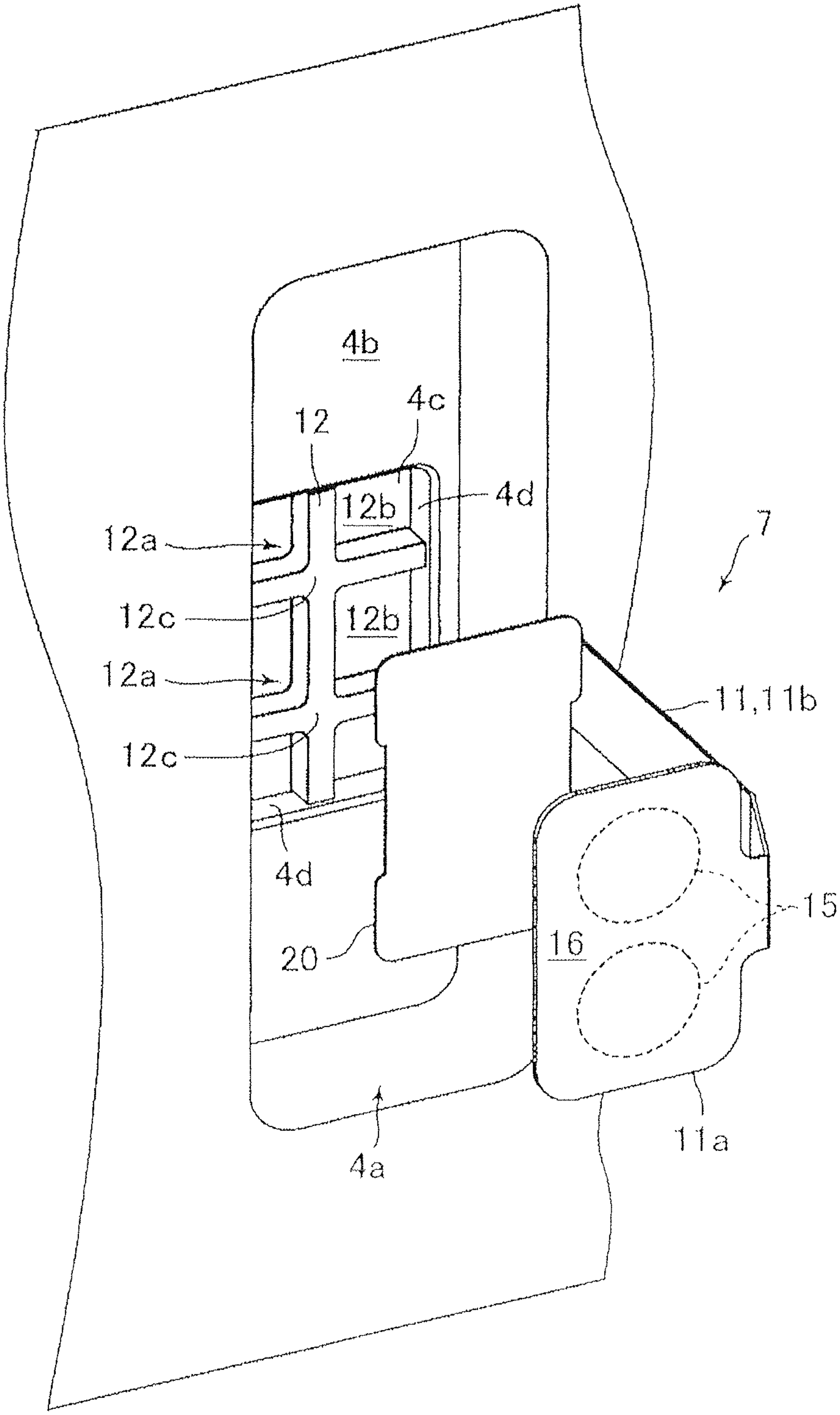
FIG. 4 is an exploded perspective view of the E section as marked in FIG. 3.
Figure 5:
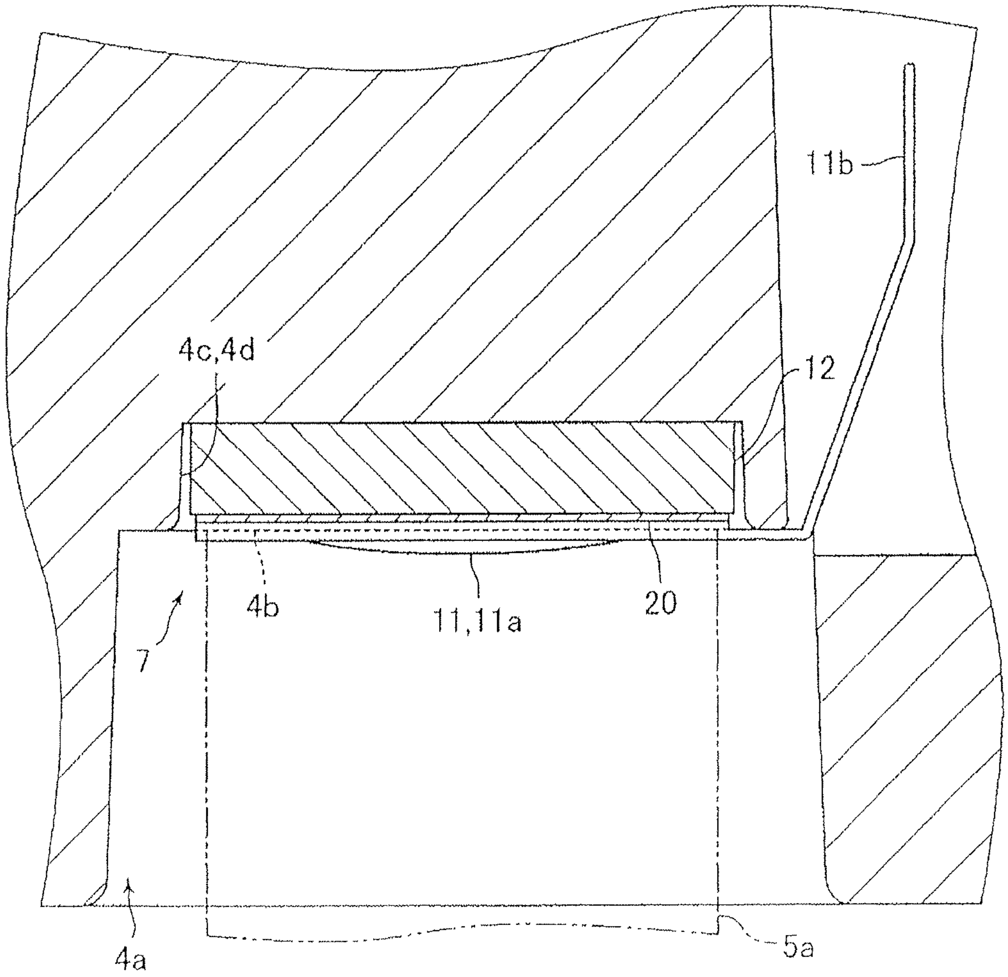
FIG. 5 is an F-F cross sectional view of FIG. 3.
Figure 6:
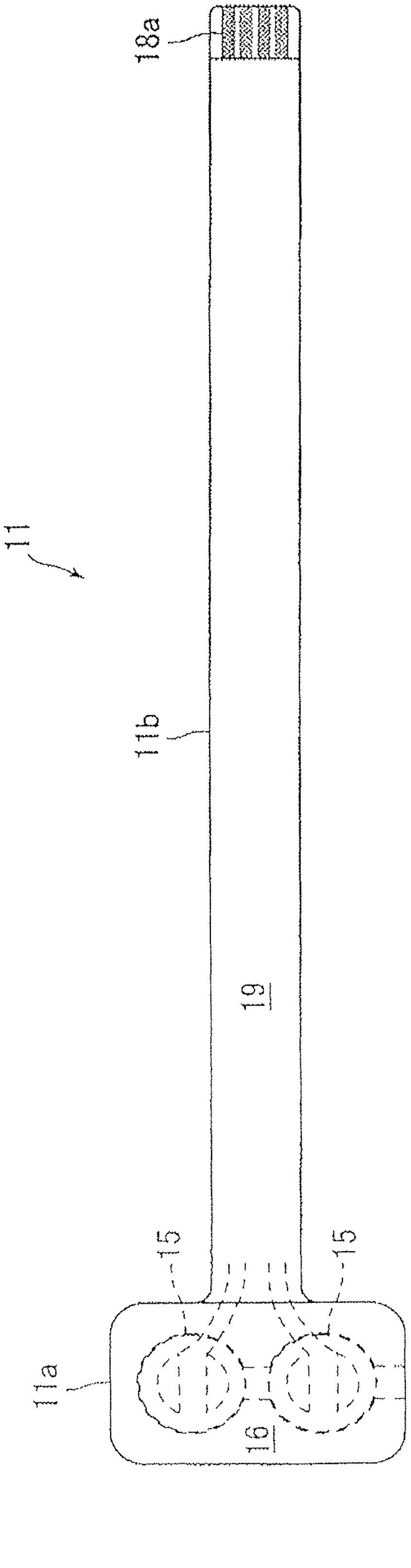
FIG. 6 is a diagram illustrating the sheet switch as illustrated in FIG. 4; (A) is a plan view and (B) is a side view.
Figure 6:
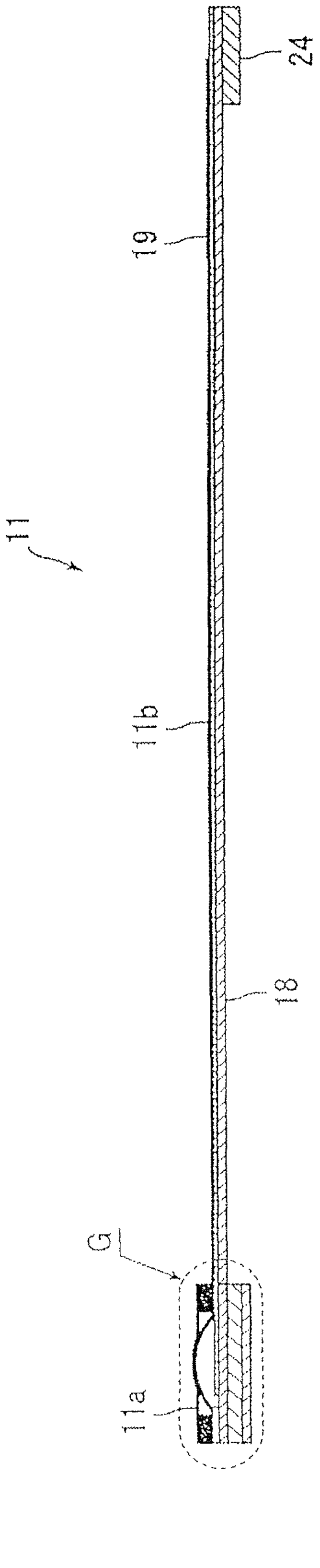
Figure 7:
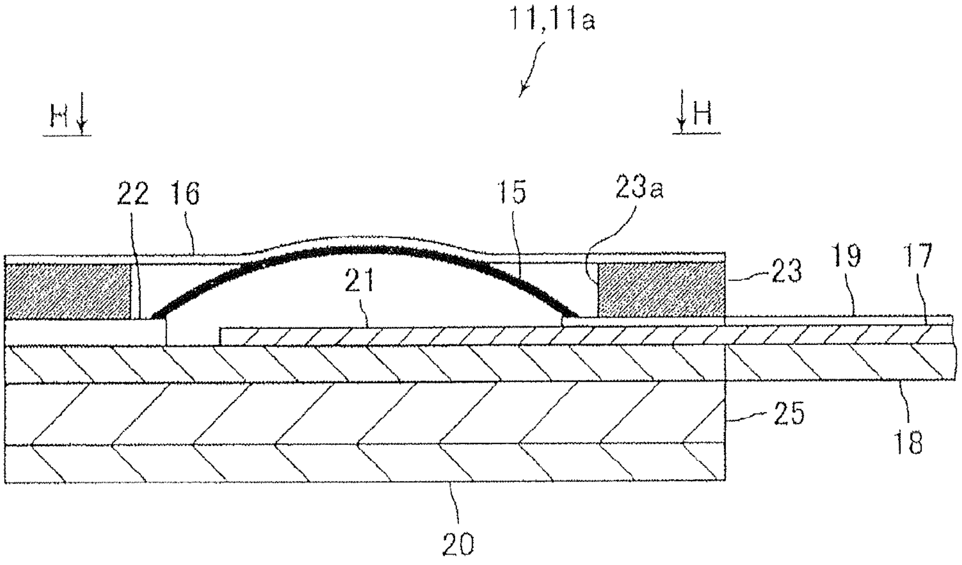
FIG. 7 is an expanded view of the G section as illustrated in FIG. 6 (B).
Figure 8:
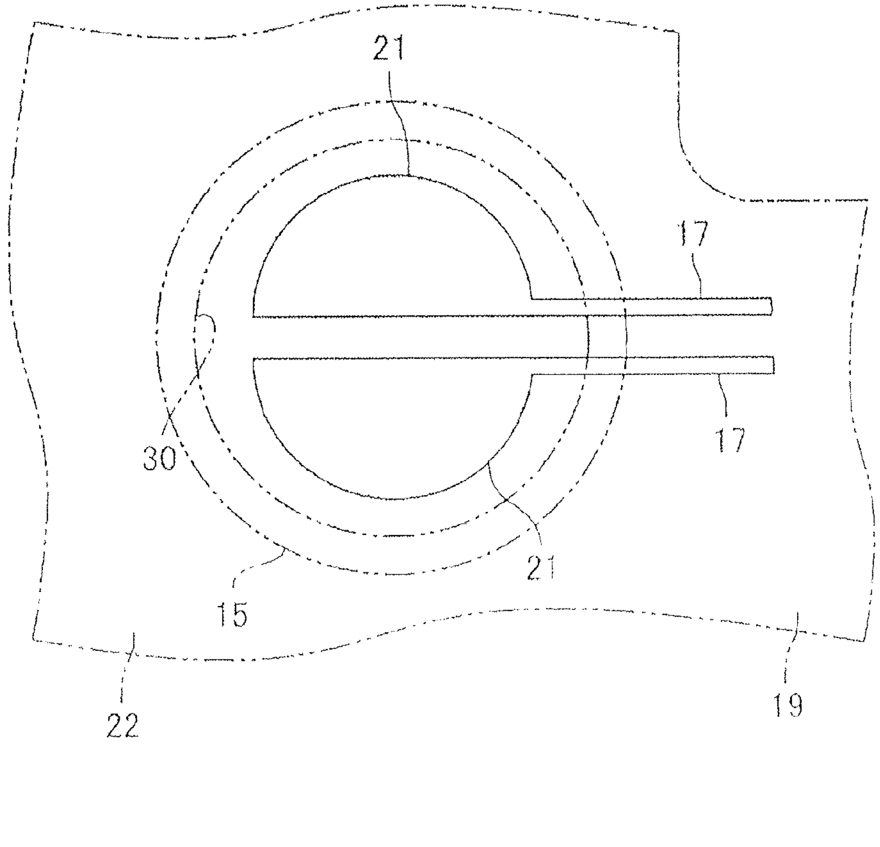
FIG. 8 is a plan view illustrating the counter electrode viewed from the H-H direction as marked in FIG. 7.
Figure 9:
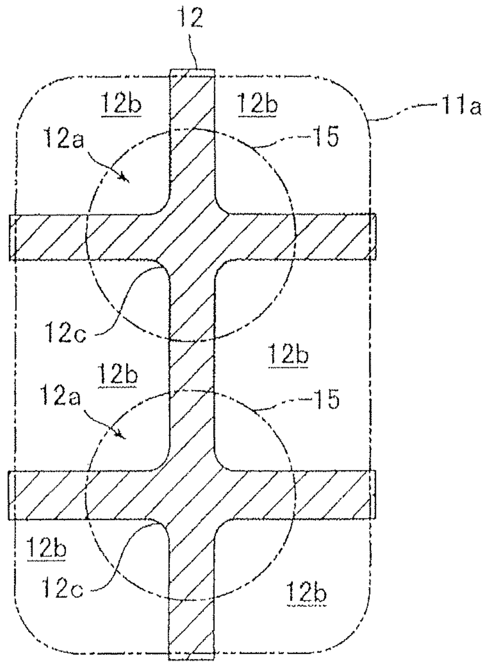
FIG. 9 is a plan view illustrating the shock-absorbing member as shown in FIG. 4.

Configurations of Sensing Mechanism and Its Peripheral Components:

FIG. 4 is an exploded perspective view of the E section as marked in FIG. 3. FIG. 5 is an F-F cross sectional view of FIG. 3. FIG. 6 is a diagram illustrating sheet switch 11 as illustrated in FIG. 4 wherein (A) is a plan view and (B) is a side view thereof. FIG. 7 is an expanded view of the G section as illustrated in FIG. 6 (B). FIG. 8 is a plan view illustrating counter electrode 21 viewed from the H-H direction as marked in FIG. 7. FIG. 9 is a plan view illustrating shock-absorbing member 12 as shown in FIG. 4.

As illustrated in FIG. 4, mounting surface 4*b* is provided with substantially rectangular recessed arrangement section 4*c* in a recessed manner to accommodate later-described shock-absorbing member 12 constituting sensing mechanism 7. In this embodiment, as illustrated in FIG. 5, card reader 1 is secured on host device 5 by the use of a screw in the state in which the plane at the tip of contact projection 5*a* provided on host device 5 is in contact with mounting surface 4*b*.

As illustrated in FIGS. 4 and 5, sensing mechanism 7 comprises sheet switch 11 and shock-absorbing member 12.

As illustrated in FIG. 6 (A), sheet switch 11 comprises wide section 11*a*, located on the left end side in FIG. 6, and narrow section 11*b* which is an elongated section narrower than wide section 11*a*. Wide section 11*a* is provided with a switch section which is depressed when it is pressed by the plane of the tip of contact projection 5*a*; this wide section 11*a* is placed in recessed mounting section 4*a*. Moreover, narrow section 11*b* is drawn in toward the inner section of card reader 1 as illustrated in FIG. 5.

This sheet switch 11 comprises, as illustrated in FIGS. 6 and 7, a contact electrode 15 provided in wide section 11*a* to constitute a part of the above-mentioned switch section, surface sheet 16 to cover the surface of contact electrode 15 (the upper surface in FIG. 7), counter sheet 18 having the surface provided with conductive pattern 17, cover sheet 19 to cover the surface of conductive pattern 17 (the upper surface in FIG. 7), and metal sheet 20 provided on the back face side of counter sheet 18 (the lower surface in FIG. 7). As illustrated in FIG. 7, the left end side of conductive pattern 17 is exposed without being covered by cover sheet 19. The exposed part of this conductive pattern 17 provides counter electrode 21 facing contact electrode 15.

Contact electrode 15 is formed with a conductive metallic material. Further, contact electrode 15 is formed with a metallic material comprising a spring member. Specifically, contact electrode 15 of this embodiment is formed from a thin stainless steel plate. Further, contact electrode 15 is formed in a dome shape. Specifically, contact electrode 15 is formed in a dome shape rounded toward the upper side in FIG. 7; if it is pressed from the upper side, it is depressed toward the lower side. Moreover, contact electrode 15 is restored to its original dome-shape when pressure from the upper side ceases. In other words, contact electrode 15 restores itself to its original shape when the pressure from the upper side is terminated. In other words, when the pressure on contact electrode 15 applied from the upper side is removed, elastic recovery force of contact electrode 15 enables contact electrode 15 to separate from electrode 21, and enter into the OFF-state in which contact electrode 15 and counter electrode 21 do not touch. Moreover, contact electrode 15 may be formed with other metallic materials comprising spring members such as phosphor bronze.

One part of the lower end of contact electrode 15 in FIG. 7 is in contact with insulating sheet 22 formed into a thin sheet and the other part of the lower end of contact electrode 15 is in contact with cover sheet 19. In this embodiment, as illustrated in FIG. 6 (A), two contact electrodes 15 are disposed on wide section 11*a* so that the two contact electrodes 15 constitute a part of wide section 11*a*. Further, there may be one or more than three contact electrodes 11 that are provided on wide section 11*a*.

Surface sheet 16 is formed into a thin sheet using an insulating material. Specifically, surface sheet is formed with a resin such as PET and the like. As illustrated in FIG. 7, this surface sheet 16 is adhesively fixed on the upper surface of spacer 23 having arrangement hole 23*a* in which contact electrode 15 is placed. Spacer 23 is formed with a resin such as PET and the like, and is adhesively fixed on the upper surfaces of cover sheet 19 and insulating sheet 22. Surface sheet 16 and spacer 23 are provided in wide section 11*a* such that they constitute a part of wide section 11*a*.

Moreover surface sheet 16 is in contact with contact electrode 15 as illustrated in FIG. 7. In this embodiment, surface sheet 16 is not bonded to contact electrode 15. In other words, surface sheet 16 is in contact with contact electrode 15 without being bonded to contact electrode 15.

Counter sheet 18 is formed into a thin sheet using an insulating material. Specifically, counter sheet 18 is formed with a resin such as PET and the like. Moreover, counter sheet 18 is formed into a long sheet elongated in the left-to-right direction in FIG. 6 (specifically it is formed from the left end to the right end of sheet switch 11), thereby constituting a part of each wide section 11*a* and narrow section 11*b*. The upper surface of the right end side of counter sheet 18 is provided with connector-connection section 18*a*, as illustrated in FIG. 6 (A). Moreover, the lower surface of the right end side of counter sheet 18 is, as illustrated in FIG. 6 (B), secured with reinforcement plate 24 formed with a resin such as PET and the like.

Conductive pattern 17 is formed with, for example, a printed silver pastee. Moreover, conductive pattern 17 is provided from the lower part of contact electrode 15 in FIG. 6 (B) to the right end side of counter sheet 18. As described above, the exposed section of conductive pattern 17 (the left end side in FIG. 7) is counter electrode 21 facing contact electrode 15. In other words, counter electrode 21 is provided on the lower part of contact electrode 15 as illustrated in FIG. 7. As illustrated in FIG. 8, counter electrode 21 is formed substantially in a semicircle. Further, in this embodiment, the lower part of one contact electrode 15 is provided with a pair of (that is, two) counter electrodes 21 that are separate.

Cover sheet 19 is formed into a thin sheet with an insulating material. Specifically, cover sheet 19 is formed with a resin such as PET and the like. Moreover, cover sheet 19 is formed into a long sheet elongated in the left-to-right direction in FIG. 6, thereby constituting a part of both wide section 11*a* and narrow section 11*b*.

Insulating sheet 22 is also formed into a thin sheet with an insulating material in the same manner as cover sheet 19. Specifically, insulating sheet 22 is formed with a resin such as PET and the like. Moreover, insulating sheet 22 is made thicker than cover sheet 19.

In this embodiment, cover sheet 19 is formed into insulating sheet 22. As illustrated in FIG. 8, cover sheet 19 and insulating sheet 22 are provided with opening section 30. Additionally, the lower end of circular contact electrode 15 is placed at the edge of said opening section 30. In other words, the lower end of contact electrode 15 are in contact with the edge of opening 30 of cover sheet 19 and insulating sheet 22; contact electrode 15 and conductive pattern 17 are insulated. Further, cover sheet 19 and insulating sheet 22 may be formed as separate members.

Metal sheet 20 is formed into a thin sheet. Metal sheet 20 of this embodiment is formed from a thin stainless steel plate. This metal sheet 20 is fixed on the back face of counter sheet 18 by the use of gummed sheet 25. Gummed sheet 25 is formed with an insulating material such as resins and the like. Moreover, metal sheet 20 is provided on almost the entire area of wide section 11*a*, and it constitutes a part of wide section 11*a*.

In sheet switch 11 thus configured, when contact electrode 15 is pressed from the upper side in FIG. 7 and depressed toward the lower side, and contact electrode 15 comes into contact with a pair of counter electrodes 21, it becomes conductive. In other words, a pair of counter electrodes 21 is electrically connected to each other via contact electrode 15 to cause a flow of electric current from one of the paired counter electrodes 21 to the other.

Furthermore, in this embodiment, two contact electrodes 15 are provided to wide section 11*a*, and the lower part of one contact electrode 15 accommodates a pair of counter electrodes 21. Therefore, sheet switch 11 may become conductive when one of these two contact electrodes 15 comes into contact with a pair of counter electrodes 21 disposed on the lower part of contact electrode 15, or it may become conductive when both of these two contact electrodes 15 come into contact with a pair of counter electrodes 21 disposed on the lower part of contact electrode 15. In other words, sheet switch 11 may become non-conductive when both of these two contact electrodes 15 separate from counter electrode 21 disposed on the lower part of contact electrode 15, or it may become non-conductive when one of these two contact electrodes 15 separates from counter electrode 21 disposed on the lower par of contact electrode 15.

Shock-absorbing member 12 is formed with, for example, rubber. Shock-absorbing member 12 of this embodiment is formed with rubber with little compression set and excellent heat resistance, cold resistance, as well as excellent weather resistance, ozone resistance and non-conductance. Shock-absorbing member 12, is formed with, for example, silicone rubber. As illustrated in FIG. 4, this shock-absorbing member 12 is placed in recessed arrangement section 4*c* formed on mounting surface 4*b* to be held in recessed arrangement section 4*c*. The main body frame of card processing section 4 of this embodiment is the holding member which holds shock-absorbing member 12.

Furthermore, shock-absorbing member 12 comprises, as illustrated in FIG. 9, two cross-shaped section 12*a* formed substantially in a cross shape. Shock-absorbing member 12 of this embodiment is formed by connecting one ends of each member of these two cross-shaped sections 12*a*. Specifically, shock-absorbing member 12 is formed by connecting the lower end of cross-shaped section 12*a* positioned on the upper side in FIG. 9 and the upper end of cross shaped section 12*a* positioned on the lower side in FIG. 9. In other words, shock-absorbing member 12 of this embodiment is provided with a plurality of rectangular notch sections 12*b* so that the entire perimeter of the outside circumference surface of shock-absorbing member 12 does not touch wall surface 4*d* of recessed arrangement section 4*c* (See FIGS. 4 and 9). By forming these notch sections 12*b*, shock-absorbing member 12 has the shape comprising two cross-shaped sections 12*a*.

The upper end and both of the right and left ends of cross-shaped section 12*a* positioned on the upper side in FIG. 9 can come into contact with wall surface 4*d* of recessed arrangement section 4*c*. And the lower end and both of the right and left ends of cross-shaped section 12*a* positioned on the lower side in FIG. 9 can come into contact with wall surface 4*d* of recessed arrangement section 4*c*. Furthermore, the center of cross-shaped section 12*a* is contact pressure-receiving section 12*c* which is provided at the position corresponding to the contact position between contact electrode 15 and counter electrode 21 (that is, lower part of contact electrode 15 in FIG. 7).

Sheet switch 11 is secured inside recessed mounting section 4*a* in such a way that metal sheet 20 comes into contact with shock-absorbing section 12 as illustrated in FIG. 5.

Specifically, sheet switch 11 is secured inside recessed mounting section 4*a* in such a way that, when card reader 1 is not attached to host device 5, the contact electrode 15 side of sheet switch 11 protrudes from mounting surface 4*b* (See FIG. 5).

As described above, card reader 1 is fixed on host device 5 in such a manner that the plane of the tip of contact projection 5*a* provided in host device 5 is in contact with mounting surface 4. In the state in which card reader 1 is fixed on host device 5, shock-absorbing member 12 contracts upward in FIG. 5. Moreover, in this state, the plane of the tip of contact projection 5*a* is in contact with the contact electrode 15 side of sheet switch 11, and contact electrode 15 is depressed by the pressure until contact electrode 15 and counter electrode 21 come into contact with each other to cause sheet switch 11 to become conductive. In other words, card reader 1 is attached to host device 5 in the state in which electrode 15 and counter electrode 21 are in contact with each other, and sheet switch 11 is conductive.

If card reader 1 is removed from host device 5 in this state, the pressing force applied to contact electrode 15 is eliminated, and the elastic recovery force of contact electrode 15 enables contact electrode 15 to separate from counter electrode 21, which causes sheet switch 11 to be non-conductive. In other words, the removal of card reader 1 from host device 5 is sensed when sheet switch 11 is in the non-conductive state.

Further, as described above, sheet switch 11 may become non-conductive when both of these two contact electrodes 15 separate from counter electrodes 21 provided on the lower part of contact electrode 15; or sheet switch 11 may become non-conductive when one of these two contact electrodes 15 separates from counter electrodes 21 provided on the lower part of contact electrode 15. In other words, the removal of card reader 1 from host device 5 may be sensed when both of these two contact electrodes 15 separate from counter electrodes 21 provided on the lower part of contact electrode, or the removal of card reader 1 from host device 5 may be sensed when one of these two contact electrodes 15 separates from counter electrode 21 provided on the lower part of contact electrode 15.

In the event that the removal of card reader 1 from host device 5 is sensed when both of these two contact electrodes 15 separate from counter electrodes 21 provided on the lower part of contact electrode 15, erroneous sensing made by sensing mechanism 7 can be prevented. Moreover, in the event that the removal of card reader 1 from host device 5 is sensed when one of these two contact electrodes separates from counter electrode 21 provided on the lower part of contact electrode 15, the failure of one of the contact electrodes 15 (and/or counter electrodes 21 provided on the lower part of contact electrode 15) will not affect sensing of the removal of card reader 1 from host device 5.

Major Effects of the Embodiment:

As described above, in this embodiment, contact electrode 15 is formed in a dome shape with a conductive metal. In other words, contact electrode 15 is not mounted on a sheet made of resin. For this reason, the problem of creep deformation the resin sheet on which contact electrode 15 is mounted is eliminated. Moreover, since contact electrode 15 is formed from a stainless steel plate, creep does not occur easily, even under high-temperature conditions.

Furthermore, in this embodiment, metal sheet 20 is provided on the back face of counter sheet 18. For this reason, the elastic recovery force of shock-absorbing member 12 generated when it contracts at the time card reader 1 is fixed on front panel 6, tends not to be concentrated on one part of resin counter sheet 18. As a result, creep occurs with difficulty on counter sheet 18. Particularly, since metal sheet 20 of this embodiment is formed with a stainless steel plate, even though the elastic recovery force generated in shock-absorbing member 12 is applied to metal sheet 20, it is difficult to deform metal sheet 20 permanently. Therefore, it becomes easier for the elastic recovery force generated by shock-absorbing member 12 to be transmitted to counter sheet 18 in a much dispersed manner.

Thus, in this embodiment, the creep phenomenon generated on the contact electrode 15 side can be prevented and, at the same time, the creep phenomenon generated on the counter electrode 21 side can be suppressed. Therefore, with sensing mechanism 7 of this embodiment, contact electrode 15 and counter electrode 21 can be prevented from generating the problem of coming into contact with each other and not separating. Accordingly, this embodiment can reliably sense the removal of card reader 1 from host device 5.

In this embodiment, contact electrode 15 is formed with a metallic material comprising a spring member. Therefore, by removing the pressing force against contact electrode 15, the elastic recovery force of contact electrode 15 can separate contact electrode 15 from counter electrode 21 reliably. In other words, the removal of the pressing force against contact electrode 15 can ensure the state in which contact electrode 15 and counter electrode 21 do not touch each other.

In this embodiment, surface sheet 16 is not bonded to contact electrode 15. Therefore, even if resin surface sheet 16 undergoes creep deformation, contact electrode 15 is unlikely to be affected by the effects of creep deformation of surface sheet 16. As a result, contact electrode 15 and counter electrode 21 are prevented from generating the problem in which they stay in contact and do not separate.

In this embodiment, sensing mechanism 7 is equipped with shock-absorbing member 12 which is in contact with metal sheet 20. Therefore, sheet switch 11 can be placed inside recessed mounting section 4*a* while protruding outward from mounting surface 4*b* without being damaged. Accordingly, even if contact projection 5*a* of host device 5 vary in size, contact projection 5*a* can touch sheet switch 11 reliably, and ensure the contact between contact electrode 15 and counter electrode 21.

In this embodiment, mounting surface 4*b* is provided with recessed arrangement section 4*c*, which accommodates shock-absorbing member 12. Further, the upper end and both of the right and left ends of cross-shaped section 12*a*, positioned on the upper side in FIG. 9, can come into contact with wall surface 4*d* of recessed arrangement section 4*c*; and, at the same time, the lower end and both of the right and left ends of cross-shaped section 12*a*, positioned on the lower side in FIG. 9, can also come into contact with wall surface 4*d* of recessed arrangement section 4*c*. Therefore, shock-absorbing member 12 can be easily aligned with respect to card processing section 4, and card reader 1 can be assembled easily.

In this embodiment, shock-absorbing member 12 is formed by connecting one end to the other of each of two cross-shaped sections 12*a*. Shock-absorbing member 12 is provided with a notch section 12*b* so that the entire perimeter of the outside circumference surface of shock-absorbing member 12 does not touch wall surface 4*d* of recessed arrangement section 4*c*. For this reason, when shock-absorbing member 12 is placed inside recessed arrangement section 4*c*, the stress applied to contact pressure receiving section 12*c* can be released by deforming shock-absorbing member 12 while contact electrode 15 and counter electrode 21 are in contact. Accordingly, counter sheet 18 is less subjected to excess stress; creep deformation of counter sheet 18 is easily prevented.

Furthermore, in sensing mechanism 7 of this embodiment, if the plane at the tip of contact projection 5*a* is lifted 0.2 mm or more above mounting surface 4*b* (i.e. the plane at the tip of contact projection 5*a* is lifted from mounting surface by 0.2 mm or more), contact electrode 15 separates from counter electrode 21, and the removal of card reader 1 from host device 5 can be sensed. In other words, in this embodiment, the removal of card reader 1 from host device 5 can be sensed, even if card reader 1 is lifted only slightly from host device 5.

Moreover, in this embodiment, even if the variation range of the plane at the tip of contact projection 5*a* varies in the range of −0.2 mm~+0.3 mm, for example, to design values, when card reader 1 is attached to host device 5, contact electrode 15 and counter electrode 21 are in secure contact; moreover, when card reader 1 is removed from host device 5, contact electrode 15 and counter electrode 21 can be separated without fail. In other words, with this embodiment, there can be a larger design tolerance for contact projection 5*a*.

Alternative Modes:

The above-described embodiment is one of the preferable embodiments of the present invention. However, the present invention is not limited to this, and can have any variations as long as the spirit of the present invention remains the same.

In the above-described embodiment, shock-absorbing member 12 is formed by connecting one end to the other of each of two cross-shaped sections 12*a*. However, shock-absorbing section 12 may have another shape as long as it comprises a contact pressure receiving section, which is provided to the position which corresponds to the contact position between contact electrode 15 and counter electrode 2, and a notch section so that the entire perimeter of the outside circumference surface of shock-absorbing member 12 does not touch wall surface 4*d* of recessed arrangement section 4*c*. Moreover, shock-absorbing member [12] may be formed in a shape of cylinder, polygonal cylinder, truncated cone, or polygonal truncated pyramid. In this case, this shock-absorbing member is provided at the position corresponding to the contact point between electrode 15 and counter electrode 21.

Figure 10:
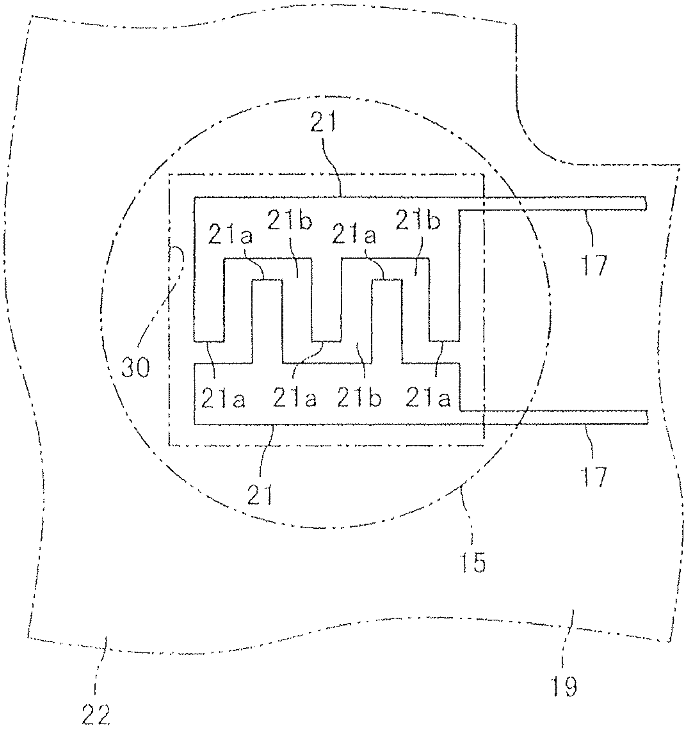
FIG. 10 is a plan view describing the shape of the counter electrode associated with another embodiment of the present invention.

In the above-mentioned embodiment, as illustrated in FIG. 8, counter electrode 21 is shaped substantially in a semicircle. Alternatively, as illustrated in FIG. 10, counter electrode 21 may be formed in a shape of comb teeth comprising multiple projections 21*a* and recessed sections 21*b* provided among projections 21*a*. In this case, projection 21*a* of one of paired counter electrodes 21 is placed in recessed sections 21*b* of the other counter electrode 21.

In the above-mentioned embodiment, sheet switch 11 is used for sensing mechanism 7 for sensing the removal of card reader 1 from host device 5. Alternatively, sheet switch 11 can be used for a sensing mechanism which is used for sensing the removal of for example, a subordinate device other than card reader 1 from the host device. Moreover, usually, sheet switch 11 may also be used for a sensing mechanism which senses a given state: Usually, the state in which contact electrode 15 and counter electrode 21 stay in contact, or on an as needed basis, the state in which contact electrode 15 and counter electrode 21 separate.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

Reference Numerals:

1 Card reader (Subordinate device)
4 Card processing section (Holding member)
4*c* Recessed arrangement section
4*d* Wall surface
5 Host device
7 Sensing mechanism
11 Sheet switch
12 Shock-absorbing member
12*a* Cross-shaped section
12*b* Notch section
12*c* Contact pressure-receiving section
15 Contact electrode
16 Surface sheet
18 Counter sheet (Insulating member)
19 Cover sheet
20 Metal sheet
21 Counter electrode
23 Spacer
23*a* Arrangement hole
25 Gum sheet (Insulating member)

The invention claimed is:

1. A sensing mechanism comprising:
a sheet switch comprising:
a contact electrode formed in a dome shape with a conductive metal;
a counter electrode disposed facing said contact electrode; and
a metal sheet that is disposed on an opposite side of said counter electrode from a side facing said contact electrode, with insulating members interposed between the metal sheet and the counter electrode;
wherein said contact electrode and said counter electrode contact each other to become conductive; and
a shock-absorbing member which comes into contact with said metal sheet;
wherein the sheet switch and the shock absorbing member are placed between a host device and a subordinate device which is mounted on the host device;
wherein, in a state in which the subordinate device is mounted on a host device, said contact electrode and said counter electrode are configured to come in contact with each other; and
wherein, in a state in which said subordinate device is removed from said host device, said contact electrode and said counter electrode are configured to be separated from each other.

2. The sensing mechanism as set forth in claim 1, further comprising:
a holding member configured to hold said shock-absorbing member, said holding member being provided with a recessed arrangement section on which said shock-absorbing member is placed.

3. The sensing mechanism as set forth in claim 2;
wherein said shock-absorbing member includes:
a contact pressure-receiving section positioned at a position corresponding to a contact point at which said contact electrode and the counter electrode come into contact; and
a notch section configured to avoid contact between the entire perimeter of an outside circumference surface of said shock-absorbing member and a wall surface of said recessed arrangement section.

4. The sensing mechanism as set forth in claim 3;
wherein said shock-absorbing member further comprises:
a cross-shaped section formed substantially in a cross-shape around the contact pressure-receiving section;
wherein at least one end of said cross-shaped section is configured to come in contact with the wall surface of said recessed arrangement section.

5. A card reader comprising:
the sensing mechanism as set forth in claim 1;
wherein the sensing mechanism is configured to be attached to said host device in a state in which said contact electrode and said counter electrode are in contact with each other.

6. The sensing mechanism as set forth in claim 1;
wherein the sheet switch further comprises:
an insulating surface sheet which covers a surface of said contact electrode; and
wherein said surface sheet touches said contact electrode without being bonded to said contact electrode.

7. The sensing mechanism as set forth in claim 6;
wherein the sheet switch further comprises:
a cover sheet which covers the surface of a conductive pattern connected to said counter electrode; and
a spacer interposed between said surface sheet and said cover sheet, the spacer having an arrangement hole on which said contact electrode is placed; and
wherein said surface sheet is bonded to said spacer.

8. The sensing mechanism as set forth in claim 1;
wherein said contact electrode is formed with a metallic material comprising a spring member.

9. The sensing mechanism as set forth in claim 1;
wherein said contact electrode and said metal sheet are formed with a stainless steel.

* * * * *